No. 754,764. PATENTED MAR. 15, 1904.
J. B. GOTTSHALK.
EXPANSION BOLT.
APPLICATION FILED APR. 22, 1903.
NO MODEL.
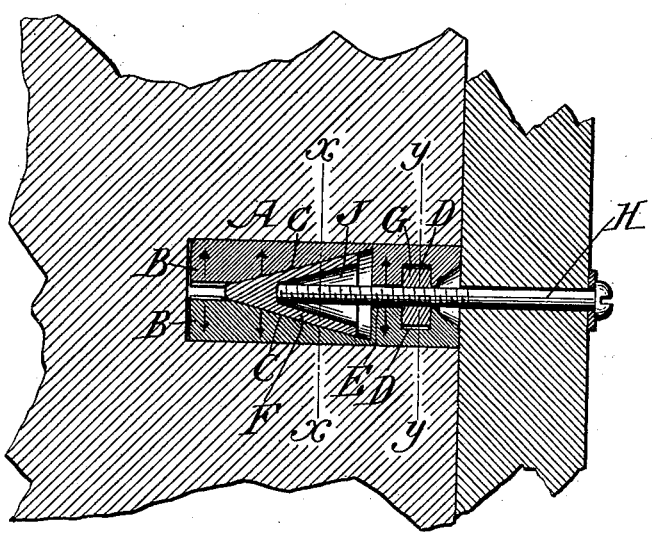
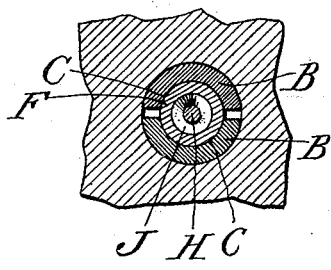
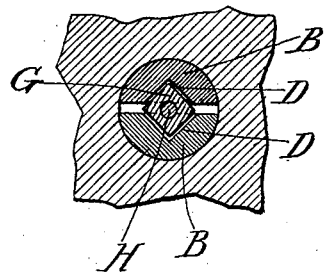
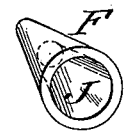
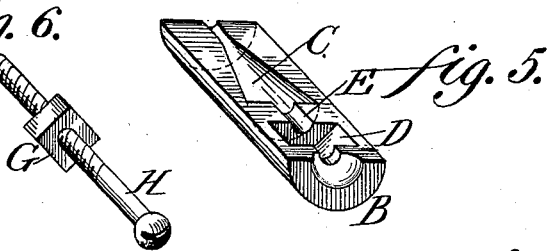
Witnesses
Inventor
John B. Gottshalk.
By Diedersheim + Fairbank
Attorneys No. 754,764. Patented March 15, 1904.

UNITED STATES PATENT OFFICE.

JOHN B. GOTTSHALK, OF PHILADELPHIA, PENNSYLVANIA, ASSIGNOR TO JOHN ORR, OF PHILADELPHIA, PENNSYLVANIA.

EXPANSION-BOLT.

SPECIFICATION forming part of Letters Patent No. 754,764, dated March 15, 1904.

Application filed April 22, 1903. Serial No. 153,747. (No model.)

*To all whom it may concern:*

Be it known that I, JOHN B. GOTTSHALK, a citizen of the United States, residing in the city and county of Philadelphia, State of Pennsylvania, have invented new and useful Improvements in Expansion-Bolts, of which the following is a specification.

My invention consists of an expansion-bolt formed of a shell composed of sections, recesses on the inner faces of said sections, a conical plug and a nut respectively occupying said recesses, and a screw which is fitted to said nut and engaged with said plug, whereby said sections can be conveniently and powerfully expanded, the construction admitting of the use of a nut which is of ordinary construction and which remains seated in its recess without liability to shift or turn.

It also consists in providing the back of the plug with a recess in which the screw is centered, so that said plug moves true under the pressure of said screw.

Figure 1 represents a longitudinal section of an expansion-bolt embodying my invention. Figs. 2 and 3 represent transverse sections thereof on lines respectively $xx$ and $yy$, Fig. 1. Fig. 4 represents a perspective view of the conical plug of the device. Fig. 5 represents a perspective view of one of the sections of the shell, taken on the interior thereof. Fig. 6 represents a perspective view of the screw-nut employed.

Similar letters of reference indicate corresponding parts in the figures.

Referring to the drawings, A designates a shell which is longitudinally divided, forming semicylindrical sections B and adapted to be inserted in a bore, as usual in such cases. On the interior of each section is the half-conical recess C, V-shaped recess D, and a semicylindrical bore or throat E, which latter joins said recesses C D.

F designates a conical plug which occupies the recesses C, and G designates a nut which occupies the recesses D, said nut being of angular form, so as to properly occupy said recesses D.

H designates a screw which engages the nut G, partly occupies the bores or throats E, and has its point bearing against the back of the plug F, it being noticed that the latter has a recess or bore J therein extending from the base toward the front of said plug and that the point of said screw bears against the forward wall of said recess J, whereby said screw is centered on said plug, and the motions of the latter are true when subjected to the pressure or action of the screw H.

It will be seen that when the screw is rotated it is advanced, due to its engagement with the nut G, the plug F being also advanced whereby, owing to the tapering or conical form of the latter, the sections B are separated or spread apart, and thus they are forced powerfully and tightly against the wall of the bore which they occupy, and thus the sleeve retains its poisition in said bore.

Owing to the recesses D, the nut G may be that of ordinary polygonal form, and as it conforms to the shape of said recesses it is prevented from shifting in lateral directions and under all circumstances retains its position in said recesses. It will also be seen that the device is of a simple, practical, and strong construction and is well adapted for the purpose intended.

The plug F may be advanced to a larger extent than that shown in the drawings, where the bore to be occupied is of greater diameter than that shown.

Various changes may be made in the details of construction without departing from the general spirit of my invention, and I do not, therefore, desire to be limited in each case to the same.

Having thus described my invention, what I claim as new, and desire to secure by Letters Patent, is—

1. An expansion-bolt comprising a shell formed of a plurality of sections, a nut mounted in said shell, a tapered plug in said shell and a screw fitted in said nut, said plug having a bore therein and said screw having its point entering said bore and being centered on the base thereof.

2. An expansion-bolt comprising a shell formed of a plurality of sections having on the interior thereof, tapered recesses which point toward the rear of the shell and polygonal recesses located near the front of the shell, an angular nut occupying the latter-named recesses and held therein against longitudinal and lateral movements, a hollow tapered plug movably occupying said tapered recesses and a screw passing through and engaging with said nut and freely entering said plug and having its point adapted to be seated on the base of the bore thereof.

JOHN B. GOTTSHALK.

Witnesses:
   JOHN A. WIEDERSHEIM,
   S. R. CARR.